United States Patent [19]

Horn Feja

[11] Patent Number: 5,749,684
[45] Date of Patent: May 12, 1998

[54] PARTICULATE MATERIAL FEEDING APPARATUS AND PROCESS

[75] Inventor: Franziskus Horn Feja, Santiago, Chile

[73] Assignee: Fosfoquim S.A., Santiago, Chile

[21] Appl. No.: 655,697

[22] Filed: Jun. 3, 1996

[30] Foreign Application Priority Data

Jun. 7, 1995 [GB] United Kingdom ............... 9511494

[51] Int. Cl.$^6$ ........................................ B65G 53/50
[52] U.S. Cl. .................. 406/141; 406/28; 406/143; 406/155; 406/183
[58] Field of Search .................. 406/1, 2, 3, 10, 406/28, 29, 30, 106, 109, 141, 142, 143, 144, 155, 156, 157, 163, 181, 183

[56] References Cited

U.S. PATENT DOCUMENTS 2,509,984  5/1950  Morrow ........................ 406/143 X
4,082,364  4/1978  Krambrock ..................... 406/143 X
5,145,253  9/1992  Paul et al. ..................... 406/181 X

FOREIGN PATENT DOCUMENTS 1332837  10/1973  United Kingdom.

Primary Examiner—Andrew C. Pike
Attorney, Agent, or Firm—Merchant, Gould, Smith, Edell, Welter & Schmidt, P.A.

[57] ABSTRACT

An apparatus and process feed at a controlled rate a free-flowing particulate material entrained in a carrier gas. The apparatus includes a gastight closed supply vessel for holding a supply of the particulate material and a riser tube inside the supply vessel, the bottom end of which is open near the bottom of the supply vessel and faces a venturi nozzle connected or adapted to be connected to a propellant gas supply. A bend at the top end of the riser tube leads by way of a duct outside the supply vessel. The riser tube includes an upwardly directed aperture at the beginning of the bend inside the supply vessel in axial alignment with the riser tube.

15 Claims, 1 Drawing Sheet

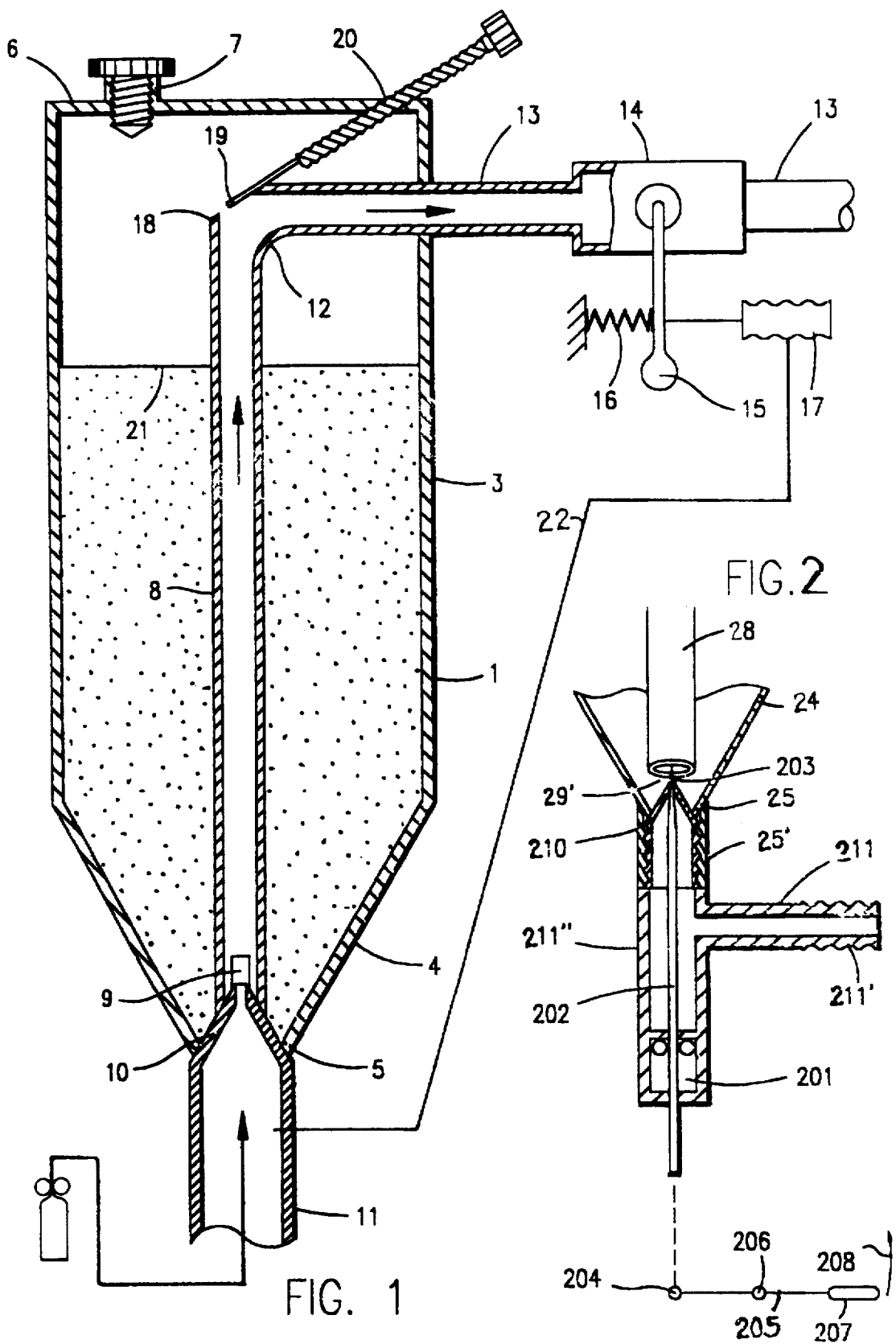

ns of the propellant gas flow rate.
PARTICULATE MATERIAL FEEDING APPARATUS AND PROCESS

BACKGROUND INVENTION AND PRIOR ART

The present invention relates to an apparatus and process for feeding at a controlled rate a free-flowing particulate material entrained in a carrier gas. The apparatus includes a riser tube having an inlet for the particulate material adapted to be immersed in a bed of the particulate material and means for pneumatically propelling the particulate material in a gas-entrained form from the inlet region, thru the riser tube to an onward location. The process performed with this type of apparatus includes a) maintaining a riser tube having an inlet open to the particulate material, immersed in a bed of the particulate material and b) propelling said particulate material from said inlet thru the riser tube propelled by and entrained in a propellant gas to a locality to where the particulate material is to be fed, outside the bed of particulate material.

Apparatus of this type find application in a variety of technologies such as in chemical engineering (German Patent No. 2828614), in resin powder spraying equipment as used in powder spray coating (French Patent No. 2104103) and wherever else it is necessary to feed powders or granulates or similar particulate materials pneumatically from a supply point to a user locality (British Patent No. 1332837).

Where in such apparatus or process the feed rate of particulate material was controlled, this was usually achieved by setting the feed rate of the propellant gas to a particular level—optionally adjustable. This imposed certain limitations. In particular the ratios of gas to particulate material in the forwarded material were strictly interdependent, whereas in certain instances it may be desirable to be able to adjust this ratio independently of the desired feed rate for one of the components.

SUMMARY

The apparatus and process according to the present invention are based on a new feed rate control principle and were initially conceived for feeding from a supply vessel into a reactor vessel, at an accurately controlled rate, a highly reactive particulate material in a carrier gas inert to the particulate material thus avoiding contact with any environment which might react with the particulate material.

However, it is contemplated that the new feed principles could be applied to a variety of different applications, such as the prior art uses referred to above, hot air fusion coating, combustion installations (e.g., powdered fuel burners), metal coating, powder charged fire extinguishers, crop dusting, fertilizer and plant nutrient application, and a variety of chemical reactors operated with particulate reagents, of which phosphine generation by hydrolysis of metal phosphides and carbide hydrolysis for acetylene production are two examples.

The present invention was found to be particularly suitable for use in situations where relatively small amounts of powder or granulate need to be fed at a controlled rate.

In accordance with the present invention there is provided an apparatus as set out in the opening paragraph, wherein, for the control of the rate of feeding, the riser tube leads into a bend remote from the inlet arranged to deflect the propelled particulate material thru the bend into a duct for onward forwarding and the bend has an aperture passing thru the outer periphery of the bend, directed substantially in axial alignment with the riser tube and which is designed to be outside the bed of particulate material and to intercept and eject by its momentum a proportion of the propelled particulate material, thereby correspondingly reducing the proportion destined for onward forwarding.

In a preferred embodiment the riser tube and bend are mounted inside a supply vessel for holding a bed of the particulate material under a gas space in the upper portion of the supply vessel, and the bend itself or thru further duct means leads to the outside of the supply vessel. Preferably the upper portion of the supply vessel is closed or closable in a gastight manner.

In the preferred embodiments the means for pneumatically propelling include a venturi device. More particularly the inlet region of the riser tube is associated with a venturi nozzle connected or adapted to be connected to a propellant gas supply and directed into the riser tube.

The riser tube could conceivably be orientated at almost any angle. However, preferably the riser tube from its inlet region to the bend proceeds in an at least approximately upright direction.

Advantageously the venturi nozzle includes a needle valve having a needle valve needle the tip of which, when the needle valve is closed, passes thru the nozzle aperture, clearing the nozzle from blockages, closing the nozzle against entry of particulate material from the bed and closing the nozzle to the propellant gas. Preferably the needle valve needle is movably accommodated in a portion of a propellant gas supply passage terminating with the venturi nozzle.

Also according to the invention the process as set out in the opening paragraph comprises the feature that the rate of feeding particulate material to said locality is controlled by directing the entrained particulate material so propelled towards and into a bend remote from the inlet of the riser tube and leading by way of an onward duct to said locality; ejecting a proportion of the entrained material by its momentum thru an aperture outside the bed of particulate material, passing thru the outer periphery of the bend, and directed substantially in axial alignment with the riser tube; deflecting the remaining proportion of the entrained particulate material thru the bend towards said locality; and optionally returning the ejected proportion to the bed. This may include adjusting the size of the aperture, thereby adjusting the proportion of the particulate material which is carried onwards around the bend towards said locality.

In specific embodiments the bed of particulate material is maintained in a supply vessel containing the riser tube and having a top which is kept closed gastight, confining an atmosphere of the propellant gas. For example, the propellant gas may be inert to the particulate material.

The apparatus operates on the principle that a carrier gas is injected into the riser tube from the venturi nozzle and draws in particulate material from the supply vessel and carries it up the riser tube in an entrained condition. As the entrained material reaches the bend at the top of the riser tube a portion of the entrained particulate material is carried onwards in the axial direction by its momentum and is ejected thru the aperture in the bend and thus returned into the supply vessel. Depending on the size of the aperture, another portion continues thru the duct and outside the supply vessel, from where it is conveyed to wherever it is needed. The ratio of powder returned to the supply vessel and powder which is onwardly conveyed depends on the size of the aperture, the flow rate of the carrier or propellant gas, and of the size of the aperture. The size of the aperture may be fixed in cases where the apparatus is to be used in strictly predetermined conditions. Preferably the aperture is adjustable, e.g., by means of a slider gate.

In a specific embodiment the bend or duct includes a stop valve which automatically closes in response to an interruption in the propellant gas supply.

The invention will now be further explained by way of example with reference to a specific embodiment illustrated in the accompanying drawing.

BRIEF DESCRIPTION OF THE DRAWINGS

FIG. 1 represents a diagrammatic vertical section thru an apparatus in accordance with the invention.

FIG. 2 represents a detail on a larger scale of the lower portion of an embodiment of the pneumatic feed device shown in FIG. 1.

DETAILED DESCRIPTION OF THE INVENTION WITH REFERENCE TO THE DRAWINGS

The embodiment in accordance with FIG. 1 includes a gastight closed supply vessel 3 the bottom 4 of which is funnel-shaped, terminating in an apex 5 and which contains a bed of particulate material 2. The top 6 of the supply vessel includes a feed inlet 7, closable in a gastight manner.

Inside the supply vessel, starting from close to the apex 5 and rising vertically near the center line of the vessel, a riser tube 8 is provided, its lower end near the apex 5 being open at its inlet region thru apertures 9 to the supply vessel and facing a venturi nozzle 10 which is vertically upwardly directed into the riser tube 8 and forms the end of a propellant gas supply tube 11 passing thru the apex 5 and leading to a propellant gas supply in the form of a carbon dioxide bottle. In use the inlet region is immersed in the bed of particulate material 2.

Shortly underneath the top 6 of the supply vessel the riser tube has a bend 12, leading by way of a duct 13 thru the side wall of the supply vessel outside the latter. The duct 13 can be opened or closed by a valve or gate which in the present example is a ball valve 14 having an operating lever 15. The lever 15 is biased to the closed position by, for example, a spring 16. A pressure-actuated device diagrammatically shown as 17, connected to the feed duct for the carrier gas ($CO_2$) 11 by a connection 22, holds the valve 14 open for as long as the carrier gas pressure in duct 11 prevails, against the bias of spring 16. However, once the pressure is turned off or seizes due to the gas bottle being empty, the spring 16 will automatically return the valve 14 to its closed position, thereby sealing off the supply vessel 1 from the continuation of the duct 13.

On the upwardly facing side of the bend 12, at the beginning of the bend, in the outer periphery thereof and in axial alignment with the riser tube 8, an upwardly directed aperture 18 is provided. Aperture 18 may be of fixed size but is preferably adjustable by means of an adjustment gate 19, operable by an adjustment screw 20 passing thru the top 6 of the supply vessel. Aperture 18 enters the gas space of the supply vessel, i.e., above the level 21 of the bed of particulate material 2.

As can be seen in FIG. 2, as an alternative to apertures 9 in FIG. 1, at the lower end of the riser tube 28, that lower end terminates with a gap 29' between itself and the apex 25. The venturi nozzle 210 is formed by a screwthreaded insert screwed into the bottom spigot 25' to which the gas supply tube 211 is connected. The gas supply tube 211 is represented by a gas hose connector nipple 211' entering sideways into the tubular member 211" welded at one end in axial alignment to the bottom spigot 25'. The opposite end terminates in a sliding seal 201 thru which passes a needle valve needle 202, the tip 203 of which, in the closed position, as shown in the drawing, passes thru and closes the venturi nozzle 210. This serves three purposes: to clear the nozzle of any blockages, to prevent solid particles from entering the nozzle and the tubular member 211", and closing the nozzle 210 in a substantially gastight manner even if gas pressure were to be admitted thru the nipple 211'. The far end of the needle 202 is pivotally connected, diagrammatically shown at 204, to an operating lever 205, pivotally supported at 206 and having an operating handle 207. Movement of the handle in the direction of arrow 208 causes the withdrawal of the needle tip from the nozzle 10 and opening of the needle valve.

Optionally the manual lever may be replaced by a pneumatically or electromagnetically operating mechanism which may optionally be programmed to operate automatically.

As a powder feeding apparatus the apparatus 1 operates as follows:

An amount of free-flowing particulate material, a powder or granulate, is charged into the supply vessel 3 thru the inlet 7. The inlet is appropriately closed in sealing relationship after the powder has been introduced, for example up to a level 21. The carrier gas supply is then opened to admit gas pressure to the carrier gas duct 11 and the device 17 which causes the valve 14 to open. Gas now enters from the gas feed duct 11 thru the nozzle 10 and into the riser tube 18 as indicated by the arrows. The venturi effect of the nozzle 10 causes particulate material to be drawn into the riser tube 8 thru the apertures 9 to be entrained in the riser tube and carried upwards. If the aperture 18 were to be completely closed, all the entrained particulate material would be carried thru the bend and thru the duct 13. However, depending on the amount by which the aperture is opened by the operation of the slide gate 19, a portion of the particulate material will be flung by its momentum in the axial direction of the riser tube thru the aperture 18 and from there will drop back into the supply vessel 3. By adjustment of the gate 19 the ratio of particulate material proceeding thru the duct 13 and that which is returned to the supply vessel can be adjusted at will resulting in a very accurate setting up of a desired feed rate for the particulate material thru the duct 13, without necessarily changing the feed rate of the gas.

It will be understood that the valve means 14, 15, 16, 17 may be replaced by an electromagnetic valve device.

As soon as the supply of pressure to the carrier gas feed duct 11 is discontinued either voluntarily or by the gas supply running empty, the pressure drop will cause the device 17 to discontinue its push against the lever 15 of the ball valve 14 and the bias of the spring 16 will automatically cause the ball valve 14 to close. The effect of this is that the contents of the supply vessel 3 are completely sealed off from the outside. If, for example, the particulate material is a metal phosphide powder or granulate, e.g., magnesium phosphide, no humidity can enter the vessel 3 from the outside and the magnesium phosphide remains completely protected against atmospheric hydrolysis.

If the apparatus is equipped with a needle valve 210, 202, as shown in FIG. 2, that needle valve is normally kept closed when the feeder device 1 is not in operation. The needle valve is opened prior to the admission of gas pressure to the gas supply duct 211. If the carrier gas is inert to the particulate material and the particulate material is to be kept under an inert atmosphere, the needle valve is opened prior to introducing the particulate material in order to flush the supply vessel 3 with inert gas admitted thru the gas supply duct 211.

The apparatus has been tested very successfully as an apparatus for feeding highly reactive magnesium phosphide granules of particle size from 0.1 mm to 2 mm into a phosphine generator without moisture entering the supply vessel 3.

What we claim is:

1. Apparatus for feeding a free-flowing particulate material entrained in a carrier gas from a bed of the particulate material, said apparatus comprising a riser tube having an inlet in an inlet region of the riser tube, the inlet being for the particulate material and adapted to be immersed in the bed of the particulate material, means for pneumatically propelling the particulate material entrained in the carrier gas from the inlet region, thru the riser tube, a duct for onward forwarding of the gas-entrained material to an onward location, a bend leading from the riser tube remote from the inlet arranged to deflect the gas-entrained particulate material thru the bend into the duct for onward forwarding, and an aperture in the bend passing thru an outer periphery of the bend, directed substantially in axial alignment with the riser tube, and being generally outside the bed of particulate material, to intercept and eject a proportion of the gas-entrained particulate material by momentum thereof to control a rate of the feeding, thereby correspondingly reducing a proportion destined for onward forwarding.

2. The apparatus as claimed in claim 1, further comprising a supply vessel for holding the bed of the particulate material under a gas space in an upper portion of the supply vessel, wherein the riser tube and the bend are mounted inside the supply vessel and the bend itself or thru further ducting leads outside of the supply vessel.

3. The apparatus as claimed in claim 2, wherein said upper portion of the supply vessel is closed or closable in a gastight manner.

4. The apparatus as claimed in claim 1, wherein the aperture is size-adjustable.

5. The apparatus as claimed in claim 1, wherein the bend and the duct form a passage which includes a stop valve which automatically closes in response to an interruption in a carrier gas supply.

6. The apparatus as claimed in claim 1, further comprising a venturi nozzle at the inlet region of the riser tube connected or adapted to be connected to a carrier gas supply and directed into the riser tube.

7. The apparatus as claimed in claim 6, wherein the venturi nozzle includes a needle valve having a needle valve needle, a tip of which, when the needle valve is closed, passes thru a nozzle aperture of the venturi nozzle, clearing the nozzle from blockages, closing the nozzle against entry of the particulate material from the bed, and closing the nozzle to the carrier gas from the carrier gas supply.

8. The apparatus as claimed in claim 7, wherein the needle valve needle is movably accommodated in a portion of a carrier gas supply passage terminating with the venturi nozzle.

9. The apparatus as claimed in claim 1, wherein the riser tube from the inlet region to the bend proceeds in an at least approximately upright direction.

10. A process for feeding at a controlled rate a free-flowing particulate material entrained in a carrier gas, said process comprising
    a) maintaining a riser tube having an inlet open to the particulate material with the inlet immersed in a bed of the particulate material;
    b) propelling said particulate material from said inlet thru the riser tube propelled by and entrained in a carrier gas to a locality to where the particulate material is to be fed, outside the bed of particulate material; and
    c) controlling a the rate of feeding the particulate material to said locality by
       1) directing the entrained particulate material so propelled towards and into a bend remote from the inlet of the riser tube and leading by way of an onward duct to said locality,
       2) ejecting a proportion of the entrained material by momentum thereof thru an aperture in the bend outside the bed of the particulate material, passing thru an outer periphery of the bend, and directed substantially in axial alignment with the riser tube, and
       3) deflecting a remaining proportion of the entrained particulate material thru the bend towards said locality.

11. The process as claimed in claim 10, further comprising returning the ejected proportion to the bed.

12. The process as claimed in claim 10, wherein said controlling further comprises adjusting a size of the aperture, thereby adjusting the proportion of the particulate material which is deflected onwards thru the bend towards said locality.

13. The process as claimed in claim 12, wherein the carrier gas is inert to the particulate material.

14. The process as claimed in claim 10, further comprising maintaining the bed of the particulate material in a supply vessel containing the riser tube and having a top which is kept closed gastight, confining an atmosphere of the carrier gas.

15. The process as claimed in claim 10, wherein said propelling comprises injecting the carrier gas into a inlet region of the riser tube by a venturi nozzle connected to a source of the carrier gas.

* * * * *